United States Patent
Lin et al.

(10) Patent No.: US 10,644,987 B1
(45) Date of Patent: May 5, 2020

(54) SUPPORTING LABEL PER EVPN INSTANCE FOR AN EVPN VIRTUAL PRIVATE WIRE SERVICE

(71) Applicant: Juniper Networks, Inc., Sunnyvale, CA (US)

(72) Inventors: Wen Lin, Andover, MA (US); John E. Drake, Pittsburgh, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 147 days.

(21) Appl. No.: 15/196,475

(22) Filed: Jun. 29, 2016

Related U.S. Application Data

(60) Provisional application No. 62/317,863, filed on Apr. 4, 2016.

(51) Int. Cl.
| | |
|---|---|
| *H04L 12/751* | (2013.01) |
| *H04L 12/723* | (2013.01) |
| *H04L 12/46* | (2006.01) |
| *H04L 12/707* | (2013.01) |

(52) U.S. Cl.
CPC .......... *H04L 45/02* (2013.01); *H04L 12/462* (2013.01); *H04L 12/4641* (2013.01); *H04L 45/22* (2013.01); *H04L 45/50* (2013.01)

(58) Field of Classification Search
None
See application file for complete search history.

(56) References Cited

U.S. PATENT DOCUMENTS

| | | | | |
|---|---|---|---|---|
| 9,781,032 | B1 * | 10/2017 | Shukla | H04L 45/66 |
| 9,838,310 | B1 * | 12/2017 | Sajassi | H04L 61/6022 |
| 10,212,075 | B1 * | 2/2019 | Lakshmikanthan | H04L 45/50 |
| 2007/0008878 | A1 * | 1/2007 | Filsfils | H04L 12/66 370/216 |
| 2010/0150020 | A1 * | 6/2010 | Rosen | H04L 45/02 370/254 |

(Continued)

OTHER PUBLICATIONS

Sajassi et al., "Integrated Routing and Bridging in EVPN," https://tools.ietf.org/html/draft-ietf-bess-evpn-inter-subnet-forwarding-01, Nov. 11, 2014, 27 pages.

(Continued)

*Primary Examiner* — Gregory B Sefcheck
*Assistant Examiner* — Suk Jin Kang
(74) *Attorney, Agent, or Firm* — Harrity & Harrity, LLP

(57) ABSTRACT

A provider edge (PE) device may determine a first identifier, corresponding to a first connection for a first service, and a second identifier, corresponding to a second connection for a second service, where the first connection is between a first customer edge (CE) device and the PE device, and the second connection is between a second CE device and the PE device. The PE device may advertise a first route, associated with the first service, based on the first identifier and a label corresponding to a network instance. The PE device may advertise a second route, associated with the second service, based on the second identifier and the label. The PE device may determine that the first connection is unavailable, and withdraw advertisement of the first route, while maintaining advertisement of the second route, to indicate, to a remote PE device, that the first connection is unavailable.

20 Claims, 8 Drawing Sheets

(56) References Cited

U.S. PATENT DOCUMENTS

| | | | | |
|---|---|---|---|---|
| 2010/0271933 A1* | 10/2010 | Li | .................. | H04L 45/00 370/219 |
| 2012/0036391 A1* | 2/2012 | Li | .................. | H04L 45/00 714/4.11 |
| 2012/0207171 A1* | 8/2012 | Ould Brahim | ........ | H04L 12/66 370/395.53 |
| 2013/0235876 A1* | 9/2013 | Sajassi | ............. | H04L 41/12 370/401 |
| 2013/0301472 A1* | 11/2013 | Allan | ............. | H04L 45/66 370/254 |
| 2013/0308646 A1* | 11/2013 | Sajassi | ............. | H04L 45/66 370/395.53 |
| 2014/0226531 A1* | 8/2014 | Farkas | .......... | H04L 41/0893 370/256 |
| 2014/0233369 A1* | 8/2014 | Salam | .......... | H04L 41/0677 370/218 |
| 2015/0006757 A1* | 1/2015 | Boutros | .......... | H04L 45/14 709/242 |
| 2015/0010011 A1* | 1/2015 | Allan | ............. | H04L 45/66 370/401 |
| 2015/0319007 A1* | 11/2015 | Allan | ............. | H04L 45/66 370/402 |
| 2016/0134525 A1* | 5/2016 | Zhang | ........... | H04L 12/6418 370/392 |
| 2016/0191374 A1* | 6/2016 | Singh | ............ | H04L 41/00 370/228 |
| 2016/0261487 A1* | 9/2016 | Singh | ............ | H04L 12/4641 |
| 2016/0277210 A1* | 9/2016 | Lin | ............... | H04L 12/4625 |
| 2016/0378606 A1* | 12/2016 | Sajassi | ........... | G06F 11/1423 714/4.2 |
| 2017/0093611 A1* | 3/2017 | Arora | ............ | H04L 41/0654 |
| 2017/0099180 A1* | 4/2017 | Singh | ............ | H04L 12/413 |
| 2017/0171057 A1* | 6/2017 | Dong | ............. | H04L 45/02 |
| 2017/0195210 A1* | 7/2017 | Jacob | ............ | H04L 12/4625 |
| 2018/0006995 A1* | 1/2018 | Bickhart | ......... | H04L 12/4625 |
| 2018/0048563 A1* | 2/2018 | Sajassi | ........... | H04L 61/6022 |

OTHER PUBLICATIONS

Rabadan et al., "IP Prefix Advertisement in EVPN," https://tools.ietf.org/html/draft-ietf-bess-evpn-prefix-advertisement-02, Sep. 14, 2015, 25 pages.

Boutros et al., "VPWS support in EVPN," https://tools.ietf.org/html/draft-ietf-bess-evpn-vpws-06, Mar. 16, 2016, 16 pages.

Bashandy et al., "BGP Prefix Independent Convergence," https://tools.ietf.org/html/draft-rtgwg-bgp-pic-00, Oct. 21, 2013, 21 pages.

Muley et al., "Pseudowire Redundancy," https://tools.ietf.org/html/rfc6718, Aug. 2012, 19 pages.

Muley et al., "Pseudowire Preferential Forwarding Status Bit," https://tools.ietf.org/html/rfc6870, Feb. 2013, 36 pages.

Sajassi et al., "BGP MPLS-Based Ethernet VPN," https://tools.ietf.org/html/rfc7432, Feb. 2015, 57 pages.

\* cited by examiner

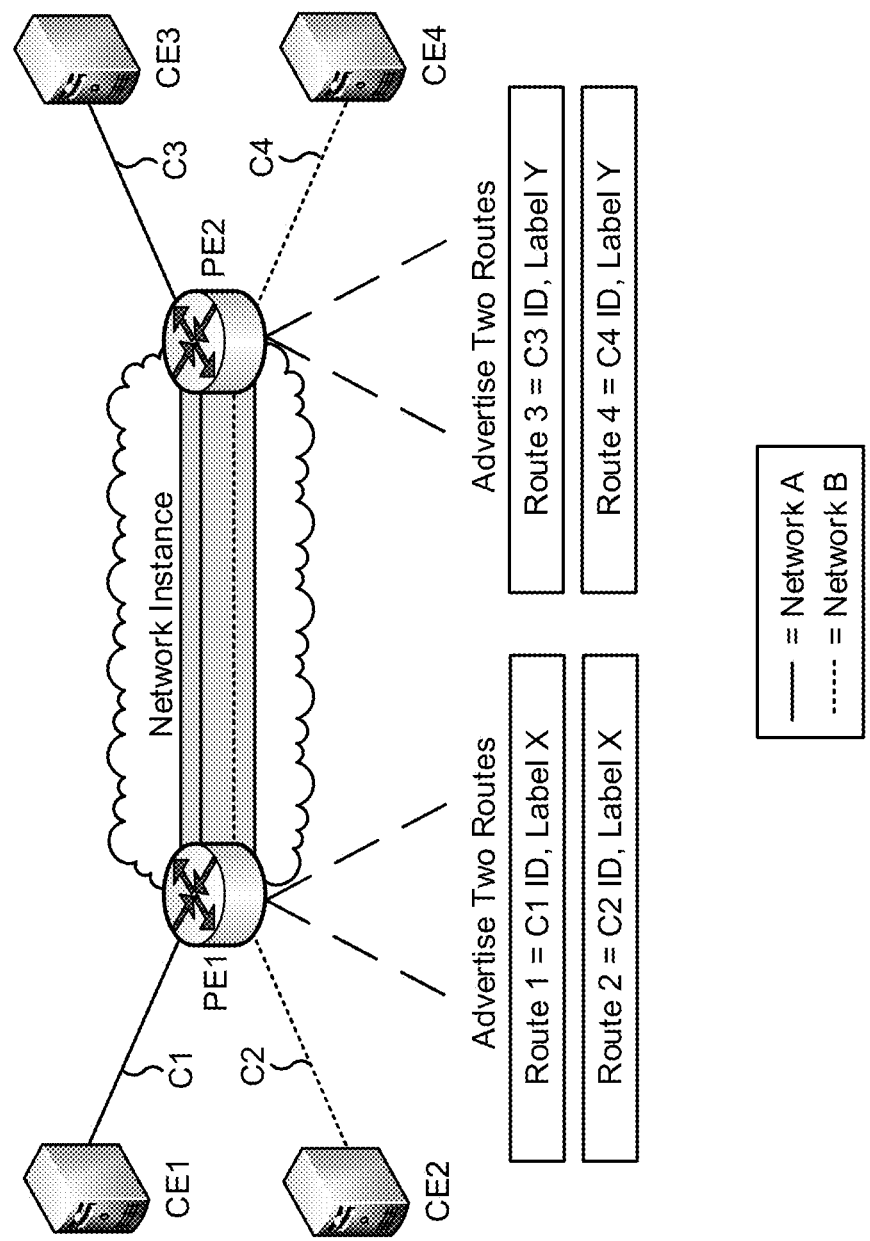

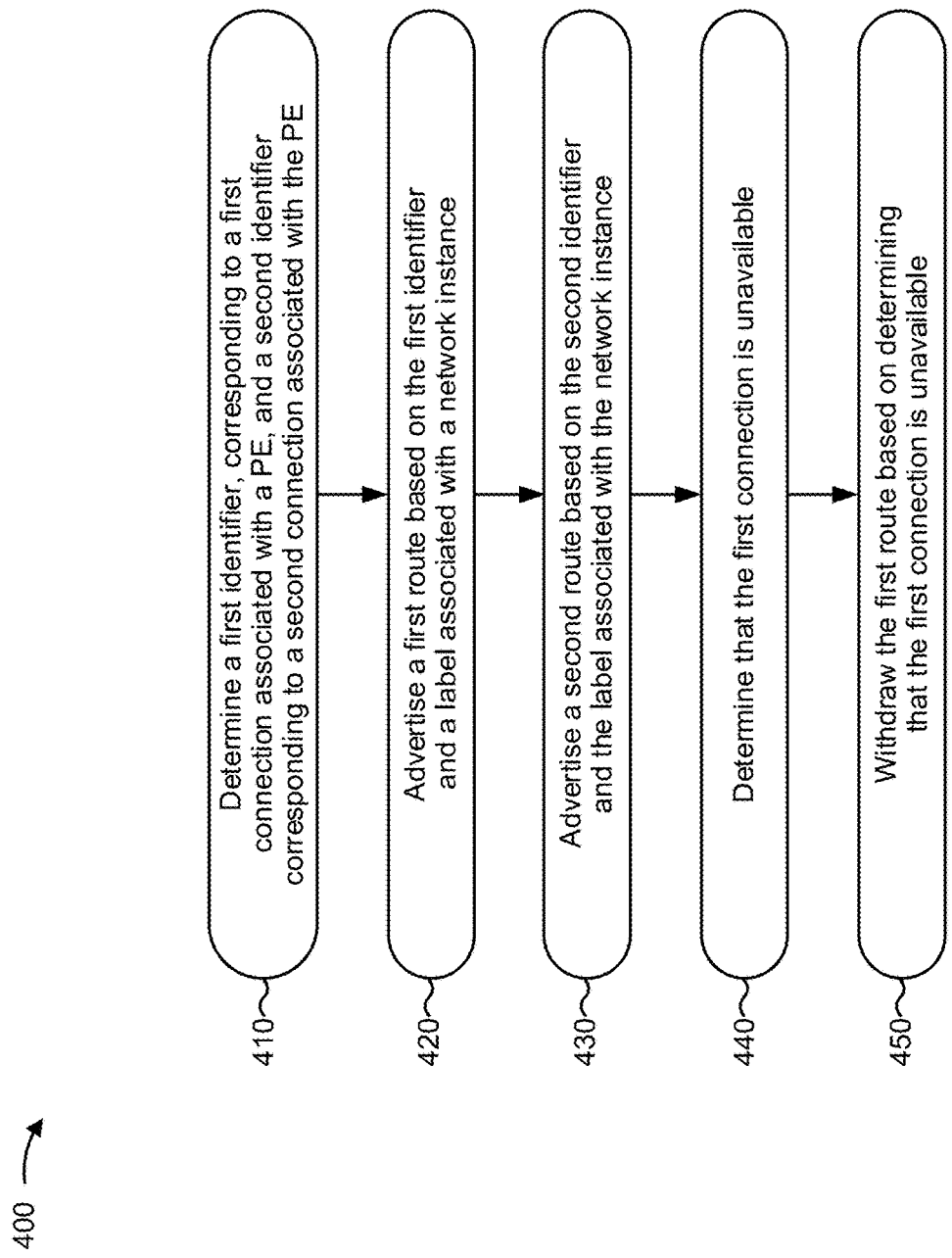

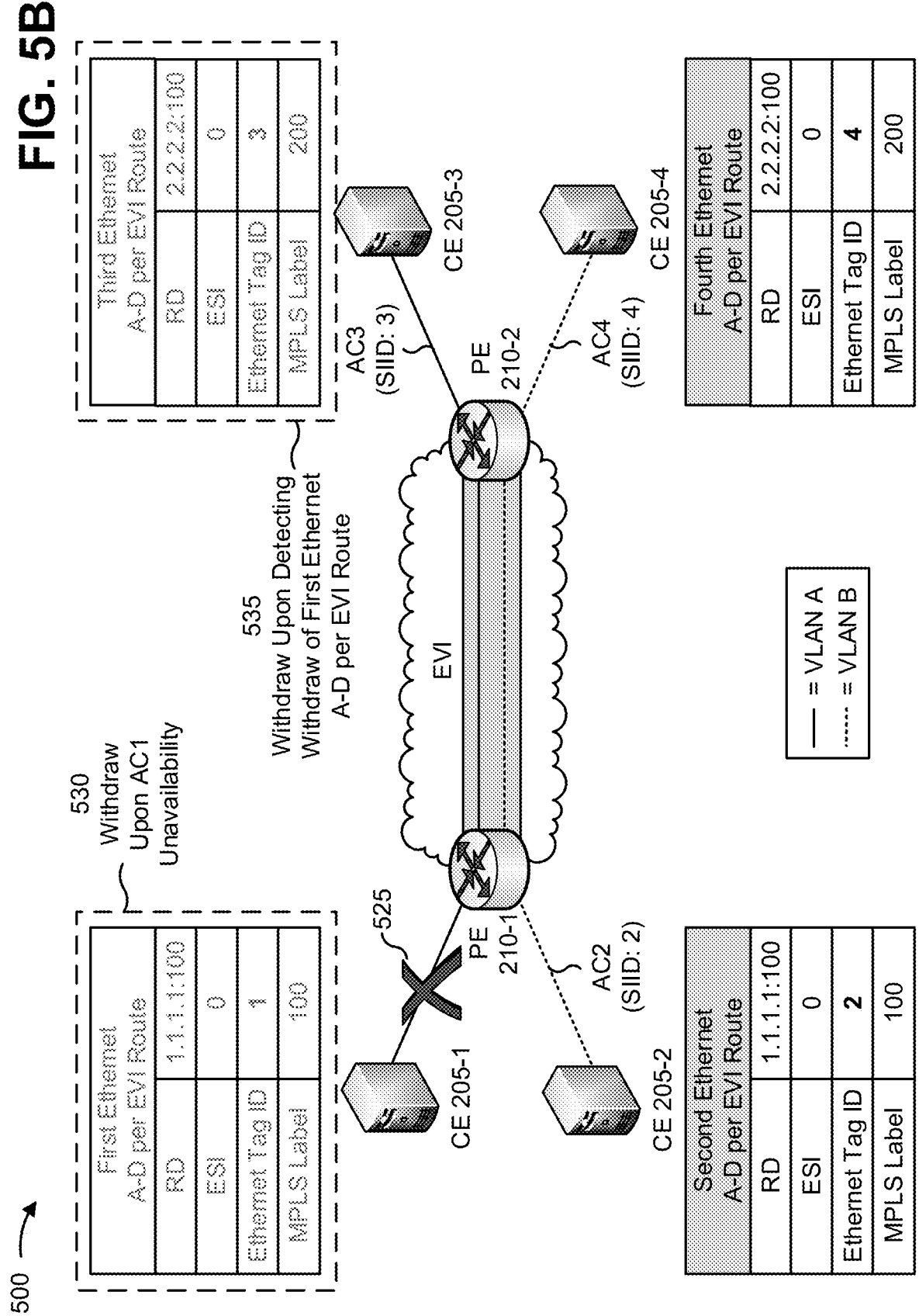

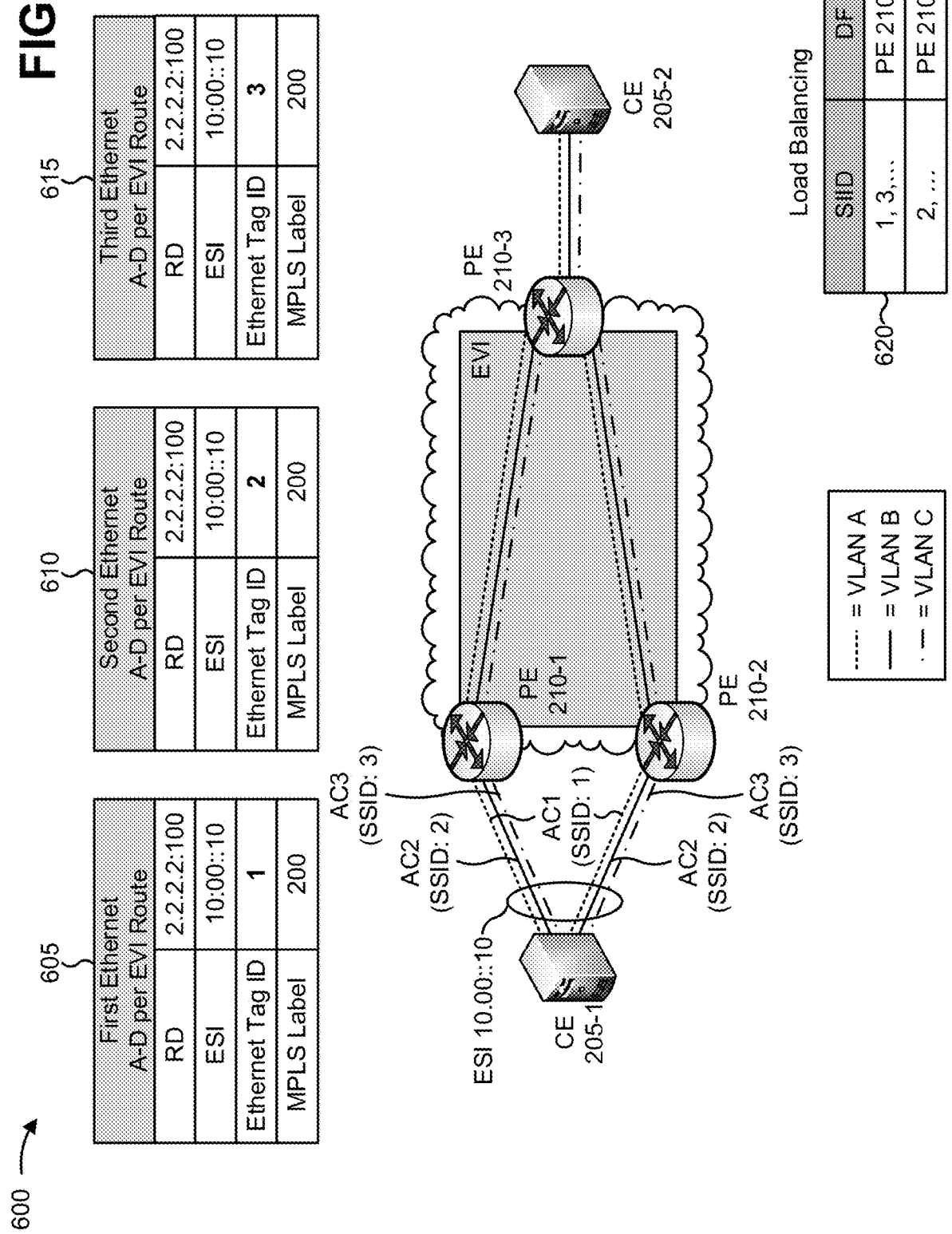

US 10,644,987 B1

SUPPORTING LABEL PER EVPN INSTANCE FOR AN EVPN VIRTUAL PRIVATE WIRE SERVICE

RELATED APPLICATION

This application claims priority under 35 U.S.C. § 119 to U.S. Provisional Patent Application No. 62/317,863, filed on Apr. 4, 2016, the content of which is incorporated by reference herein in its entirety.

BACKGROUND

An Ethernet virtual private network (EVPN) enables a group of dispersed customer sites to be connected using a Layer 2 virtual bridge. An EVPN may include customer edge (CE) devices (e.g., routers, switches, or the like) connected to provider edge (PE) devices.

SUMMARY

According to some possible implementations, a provider edge (PE) device, may include one or more processors to: determine a first identifier and a second identifier, where the first identifier may correspond to a first connection for a first service, where the first connection may be between a first customer edge (CE) device and the PE device, and where the second identifier may correspond to a second connection for a second service, where the second connection may be between a second CE device and the PE device; advertise a first route, associated with the first service, based on the first identifier and a label corresponding to a network instance associated with the first service and the second service; advertise a second route, associated with the second service, based on the second identifier and the label corresponding to the network instance; determine that the first connection is unavailable; and withdraw advertisement of the first route based on determining that the first connection is unavailable, where advertisement of the first route may be withdrawn while advertisement of the second route is maintained, and advertisement of the first route may be withdrawn to indicate, to a remote PE device associated with the first service, that the first connection is unavailable.

According to some possible implementations, a system may include a first provider edge (PE) device to: determine a first identifier corresponding to a first access circuit associated with a first service, where the first access circuit may be associated with a link between a first customer edge (CE) device and the first PE device; determine a second identifier corresponding to a second access circuit associated with a second service, where the second access circuit may be associated with a link between a second CE device and the first PE device; advertise a first route, associated with the first service, based on the first identifier and a network instance label, where the network instance label may identify a network instance associated with the first service and the second service; advertise a second route, associated with the second service, based on the second identifier and the network instance label; determine that the first access circuit is unavailable; and withdraw advertisement of the first route based on determining that the first access circuit is unavailable, where the first route may be withdrawn while advertisement of the second route is maintained; and a second PE device to: detect withdrawal of the first route by the first PE device; and withdraw a third route, associated with the first service, based on detecting the withdrawal of the first route.

According to some possible implementations, a method may include: advertising, by a provider edge (PE) device, a first route, associated with a first service, based on a first identifier and a label corresponding to a network instance associated with the PE device, where the first identifier may correspond to a first connection between a first customer edge (CE) device and the PE device; advertising, by the PE device, a second route, associated with a second service, based on a second identifier and the label corresponding to the network instance, where the second identifier may correspond to a second connection between a second CE device and the PE device; determining, by the PE device, that the first connection is unavailable; and withdrawing, by the PE device and based on determining that the first connection is unavailable, advertisement of the first route, where the first route may be withdrawn while advertisement of the second route is maintained, and the first route may be withdrawn to indicate, to a remote PE device associated with the first service, that the first service is unavailable.

BRIEF DESCRIPTION OF THE DRAWINGS

FIGS. 1A and 1B are diagrams of an overview of an example implementation described herein;

FIG. 4 is a flow chart of an example process for advertising multiple Ethernet auto-discovery (A-D) per Ethernet virtual private network (EVPN) instance routes, associated with an EVPN instance, while using one label per EVPN instance;

FIGS. 5A and 5B are diagrams of an example implementation relating to the example process shown in FIG. 4; and FIG. 6 is a diagram of an additional example implementation relating to the example process shown in FIG. 4.

DETAILED DESCRIPTION

Figure 1B:
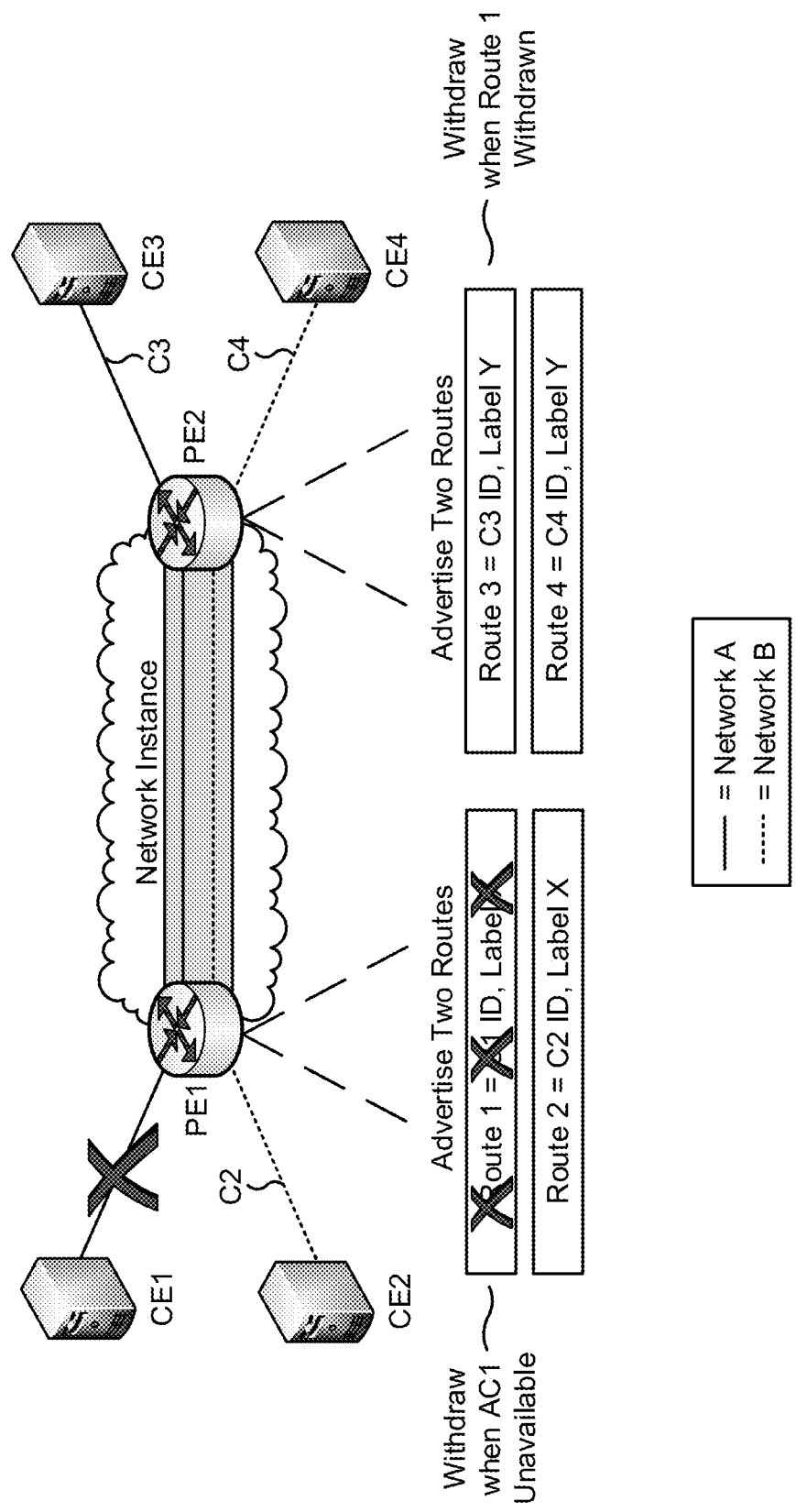

The following detailed description of example implementations refers to the accompanying drawings. The same reference numbers in different drawings may identify the same or similar elements.

EVPN may be used to support a virtual private wire service (VPWS) in a multi-protocol label switching (MPLS)/Internet protocol (IP) network in order to provide benefits of EVPN to a point-to-point (p2p) service (also referred to as a VPWS service). EVPN may allow for forwarding of traffic to and/or from a given customer access circuit (AC) without a need to perform a media access control (MAC) address lookup. Here, the AC may correspond to a port (e.g., an Ethernet segment (ES)), a virtual local area network (VLAN) on a port, a group of VLANs on a port, or the like.

A VPWS service instance may be identified by a pair of VPWS service instance identifiers: a local service instance identifier (SIID) and a remote SIID. In the control plane, each PE associated with the VPWS service instance may advertise an Ethernet Auto-Discovery (A-D) per EVPN instance (EVI) route, where an Ethernet tag identifier, corresponding to the VPWS service instance, is set to the corresponding local SIID. The PE is configured with a corresponding remote SIID based on an Ethernet A-D per EVI route advertised by the other (i.e., remote) PE involved in the VPWS service. In such a case, each AC, associated with the PE, corresponds to a different SIID such that there exists one-to-one mapping between an AC and a corresponding Ethernet A-D per EVI route. Thus, when the AC becomes unavailable, the PE withdraws the corresponding Ethernet A-D per EVI route (i.e., the PE may stop advertising the Ethernet A-D per EVI route associated with the unavailable AC). This allows the remote PE to be notified that the VPWS service, associated with the unavailable AC, is no longer available.

Each Ethernet A-D per EVI route may also include an MPLS label corresponding to the VPWS service instance. The MPLS label is used in the data plane (e.g., in conjunction with a VLAN identifier (VID)) for identifying the VPWS service instance such that traffic can be forwarded appropriately. Here, the MPLS label is used as a de-multiplexer to identify the access interface at the egress PE. In this case, there exists one-to-one mapping between an MPLS label and a corresponding Ethernet A-D per EVI route (i.e., each Ethernet A-D per EVI route may be associated with a different MPLS label). However, this technique may require use of many MPLS labels as the number of VPWS services increases—one MPLS label for each VPWS service instance.

Flexible cross-connect is one type of interface service for EVPN VPWS. The flexible cross-connect service allows multiple AC pairs (e.g., each identified by a single VLAN tag or double VLAN tags), associated with multiple VPWS services, to be multiplexed on a same VPWS service instance. Here, PEs instantiating a given VPWS service instance may advertise a single Ethernet A-D per EVI route with a VPWS service instance identifier (e.g., a local SIID, included in the advertised Ethernet A-D per EVI route, is set in an Ethernet tag identifier field) that corresponds to the multiple ACs. In this case, the VPWS service instance identifier does not correspond to a particular AC, but to the multiple ACs associated with the VPWS service instance. Here, since multiple ACs are multiplexed on the same VPWS service instance, only a single MPLS label is needed in the single Ethernet A-D per EVI route, which results in reduced label usage and increased scalability (e.g., as compared to the technique described above).

However, for the flexible cross-connect service, when there are multiple ACs associated with a single VPWS service instance, the SIID no longer identifies one AC, but a group of ACs associated with a given PE. Thus, in the control plane, the Ethernet A-D per EVI route, associated with the VPWS service instance, cannot be withdrawn when a given AC is unavailable (i.e., when a connection or link fails, when a corresponding CE experiences an error, or the like). Rather, the Ethernet A-D per EVI route may only be safely withdrawn when all ACs, associated with the VPWS service instance, are unavailable.

In other words, since the advertised Ethernet A-D per EVI route is associated with multiple ACs, the PE may not withdraw the Ethernet A-D per EVI route when a single AC, of the multiple ACs, is unavailable (e.g., since other ACs, associated with the SIID advertised in the Ethernet A-D per EVI route, may still be available). As such, the PE is unable to signal (e.g., to the remote PE) that a particular AC, associated with a particular VPWS service, is no longer available. In such a case, the remote PE may continue to send traffic, associated with the particular VPWS service, and the traffic may be discarded and/or black holed (e.g., dropped without notifying the remote PE), which results in wasted and/or inefficient use of network resources.

The lack of information to identify each AC, of the multiplexed ACs, when using the flexible cross-connect service is also a problem for supporting a redundant VPWS service with all-active and/or single-mode (e.g., if an ES identifier (ESI) per port is used). In such a case, since the Ethernet tag identifier field is used for identifying the SIID, there is no place to identify the AC or a VID, associated with the AC, in the Ethernet A-D per EVI route advertisement. As such, ACs on a same multi-homed ES may share a same Ethernet A-D per EVI route, and a similar problem associated with notifying a remote PE of AC unavailability arises. Moreover, since traffic may not be identified on a per AC basis, load balancing is performed based on the single SIID. As a result, load balancing for VPWS services using the flexible cross-connect service may not be achieved (e.g., since the SIID is shared by all ACs, a particular PE may always be selected as a designated forwarder).

Implementations described herein may provide a PE configured to advertise multiple Ethernet A-D per EVI routes, associated with multiple ACs, where each Ethernet A-D per EVI route includes a SIID corresponding to a single AC, of the multiple ACs, and a same MPLS label in accordance with a flexible cross-connect service. Advertisement of multiple Ethernet A-D per EVI routes allows the PE to signal when a particular AC, of the multiple ACs, is unavailable while reducing label usage through use of the same MPLS label in association with each of the Ethernet A-D per EVI routes.

FIGS. 1A and 1B are diagrams of an overview of an example implementation 100 described herein. As shown in FIG. 1A, a network instance (e.g., an instance of a virtual private network that spans two or more PE devices, such as an EVPN instance) is configured between PE1 and PE2. Here, assume that a first service (e.g., a VPWS service), within the network instance, is associated with transferring traffic of network A (e.g., a first VLAN) between CE1 and CE3, and that a second service, within the network instance, is associated with transferring traffic of network B (e.g., a second VLAN) between CE2 and CE4. Further, assume that each PE has access to configuration information, associated with the first service and the second service, that includes identifiers corresponding to connections (e.g., ACs) associated with the first service and the second service. For example, assume that each PE has access to identifiers that identify connections, associated with the other PE, and information that identifies the services associated with those connections.

As shown in FIG. 1A, PE1 may advertise a first route (e.g., a first Ethernet A-D per EVI route) associated with the first service. As shown, the first route advertisement may include a first identifier (e.g., C1 ID) that corresponds to a first connection (e.g., C1) of the first service, and a label, associated with the network instance (i.e., a network instance label), stored by PE1.

As further shown in FIG. 1A, PE1 may advertise a second route associated with the second service. As shown, the second route advertisement may include a second identifier (e.g., C2 ID) that corresponds to a second connection (e.g., C2) of the second service, and the label, associated with the network instance, stored by PE1. Notably, both the first route and the second route include the same label associated with the network instance (e.g., shown as Label X).

As shown in FIG. 1A, PE2 may advertise a third route associated with the first service. As shown, the third route advertisement may include a third identifier (e.g., C3 ID) that corresponds to a third connection (e.g., C3) associated with the first service, and a label, associated with the network instance, stored by PE2.

As further shown in FIG. 1A, PE2 may advertise a fourth route associated with the second service. As shown, the fourth route advertisement may include a fourth identifier (e.g., C4 ID) that corresponds to a fourth connection (e.g., C4) associated with the second service, and the label, associated with the network instance, stored by PE2. Notably, both the third route and the fourth route include the same label associated with the network instance (e.g., shown as Label Y). Here, PE1 and PE2 exchange routes (e.g., route information that identifies the routes), and may provide traffic, associated with the first service and the second service, via the network instance based on exchanging the routes.

As shown in FIG. 1B, PE1 may determine (e.g., at a later time) that the first connection, associated with the first service, is unavailable. As shown, based on determining that the first connection is unavailable, PE1 may withdraw the first route. In this way, PE1 may signal to PE2 that the first connection is unavailable (i.e., that the first service is unavailable) to prevent PE2 from sending traffic associated with the first service. As shown, PE2 may detect the withdrawal of the first route and may withdraw the third route that corresponds to the first service. In other words, PE1 may notify PE2 regarding the unavailability of the first connection while maintaining advertisement of the second route and using a single label in association with transferring traffic associated with the network instance.

In this way, a PE may advertise multiple routes, associated with multiple connections, where each route includes an identifier corresponding to a single connection, of the multiple connections, and a same label, associated with a network instance, in accordance with a flexible cross-connect service, thereby conserving label usage while still allowing signaling of a failed connection.

As indicated above, FIGS. 1A and 1B are provided merely as an example. Other examples are possible and may differ from what was described with regard to FIGS. 1A and 1B.

Figure 2:
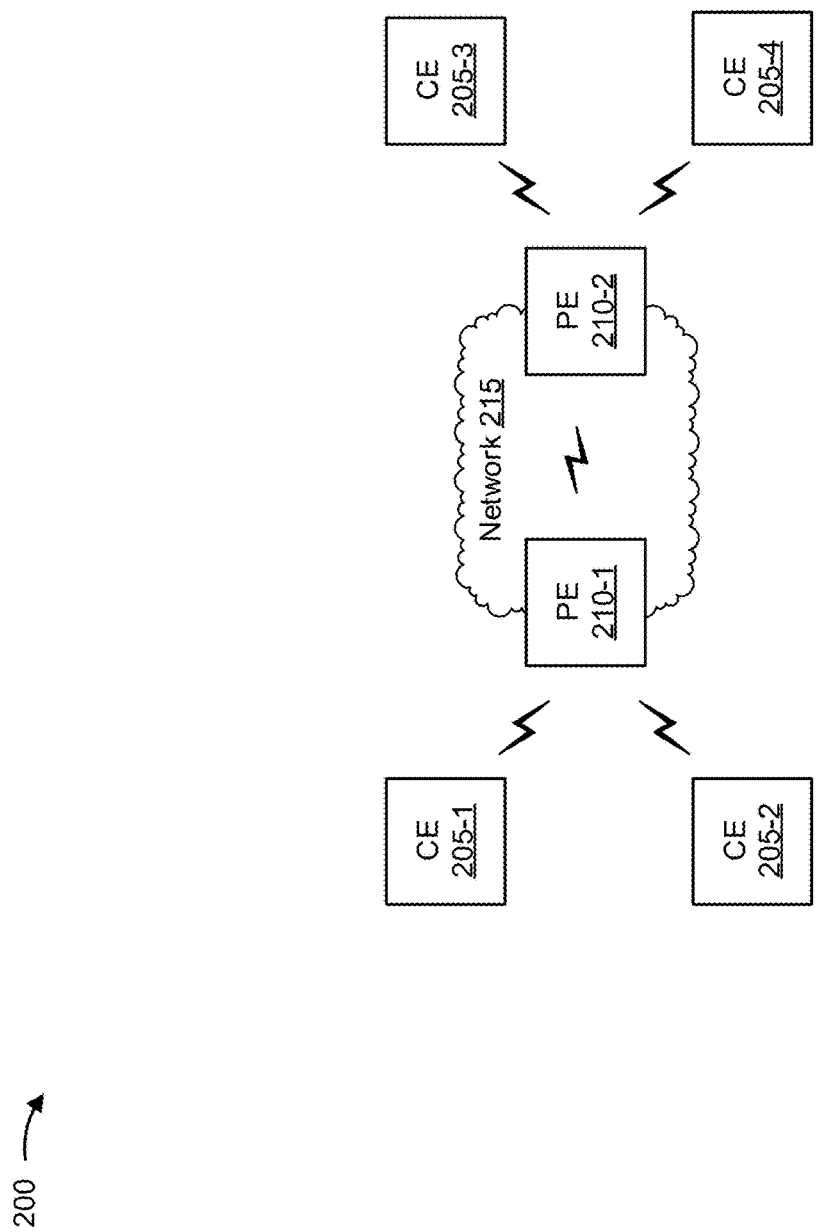
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include CE devices 205-1 through 205-4 (herein collectively referred to as CEs 205, and individually as CE 205), PE devices 210-1 and 210-2 (herein collectively referred to as PEs 210, and individually as PE 210), and a network 215. Devices of environment 200 may interconnect via wired connections, wireless connections, or a combination of wired and wireless connections.

CE 205 includes a device, positioned at an edge of a customer network, that is capable of processing and/or transferring traffic associated with one or more EVPN VPWS services, as described herein. For example, CE 205 may include a router, a gateway, a switch, a server, a modem, a network interface card (NIC), a hub, a bridge, an optical add-drop multiplexer (OADM), or the like. In some implementations, CE 205 may be capable of sending the traffic to and/or receiving the traffic from one or more PEs 210.

PE 210 includes a device, positioned at an edge of a service provider network, that is capable of processing and/or transferring traffic associated with one or more EVPN VPWS services, as described herein. For example, PE 210 may include a router, a gateway, a switch, a server, a modem, a NIC, a hub, a bridge, an OADM, or the like. In some implementations, PE 210 may be an ingress PE and/or an egress PE associated with network 215.

Network 215 includes one or more wired and/or wireless label switching networks that support use of one or more EVPN VPWS services. For example, network 215 may include an MPLS network, a generalized MPLS (GMPLS) network, or the like. In some implementations, network 215 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or areas, fewer devices and/or areas, different devices and/or areas, or differently arranged devices and/or areas than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Notably, while example environment 200 includes a particular number of CEs 205, PEs 210, and networks 215, the devices and networks of example environment 200 are provided for explanatory purposes. In other words, the number of CEs 205, PEs 210, and/or networks 215 may differ from that shown in example environment 200.

Figure 3:
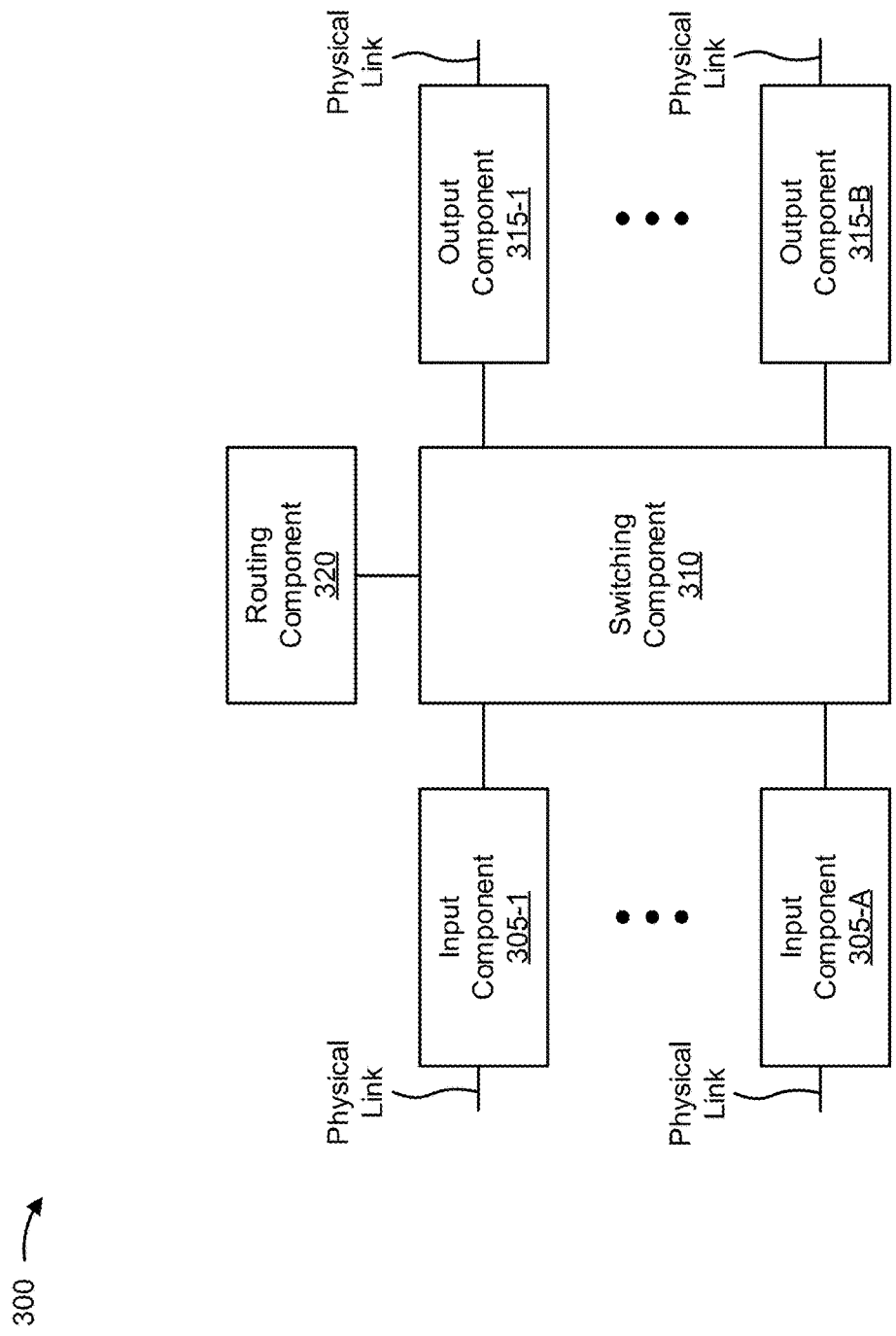
FIG. 3 is a diagram of example components of one or more devices of FIG. 2.

FIG. 3 is a diagram of example components of a device 300. Device 300 may correspond to CE 205 and/or PE 210. In some implementations, CE 205 and/or PE 210 may include one or more devices 300 and/or one or more components of device 300. As shown in FIG. 3, device 300 may include one or more input components 305-1 through 305-A (A≥1) (hereinafter referred to collectively as input components 305, and individually as input component 305), a switching component 310, one or more output components 315-1 through 315-B (B≥1) (hereinafter referred to collectively as output components 315, and individually as output component 315), and a routing component 320.

Input component 305 includes a point of attachment for physical links and may be a point of entry for traffic, such as packets. Input component 305 may process received traffic, such as by performing data link layer encapsulation or decapsulation. In some implementations, input component 305 may send packets to output component 315 via switching component 310.

Switching component 310 interconnects input components 305 with output components 315. Switching component 310 may be implemented using one or more of multiple, different techniques. For example, switching component 310 may be implemented via busses, via crossbars, and/or with shared memories. The shared memories may act as temporary buffers to store traffic from input components 305 before the traffic is eventually scheduled for delivery to output components 315. In some implementations, switching component 310 may enable input components 305, output components 315, and/or routing component 320 to communicate.

Output component 315 includes a point of attachment for physical links and may be a point of exit for traffic, such as packets. Output component 315 may store packets and may schedule packets for transmission on output physical links. Output component 315 may include scheduling algorithms that support priorities and guarantees. Output component 315 may support data link layer encapsulation or decapsulation, and/or a variety of higher-level protocols. In some implementations, output component 315 may send packets and/or receive packets.

Routing component 320 includes a processor in the form of, for example, a central processing unit (CPU), a microprocessor, a microcontroller, a field-programmable gate array (FPGA), an application-specific integrated circuit (ASIC), and/or another type of processor that can interpret and/or execute instructions. The processor is implemented in hardware, firmware, or a combination of hardware and software. In some implementations, routing component 320 may include one or more processors that can be programmed to perform a function.

In some implementations, routing component 320 may include a random access memory (RAM), a read only memory (ROM), and/or another type of dynamic or static storage device (e.g., a flash memory, a magnetic memory, an optical memory, etc.) that stores information and/or instructions for use by routing component 320.

In some implementations, routing component 320 may communicate with other devices, networks, and/or systems connected to device 300 to exchange information regarding network topology. Routing component 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Routing component 320 may perform one or more processes described herein. Routing component 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with routing component 320 from another computer-readable medium or from another device via a communication interface. When executed, software instructions stored in a memory and/or a storage component associated with routing component 320 may cause routing component 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for advertising multiple Ethernet A-D per EVI routes, associated with multiplexed ACs, while using one label per EVPN instance in accordance with a flexible cross-connect service. In some implementations, one or more process blocks of FIG. 4 may be performed by PE 210-1. In some implementations, one or more process blocks of FIG. 4 may be performed by another device or a group of devices separate from or including PE 210-1, such as PE 210-2.

As shown in FIG. 4, process 400 may include determining a first identifier, corresponding to a first connection associated with a PE, and a second identifier corresponding to a second connection associated with the PE (block 410). For example, PE 210-1 may determine a first SIID, corresponding to a first AC circuit associated with PE 210-1, and a second SIID corresponding to a second AC associated with PE 210-1.

In some implementations, PE 210-1 may determine the first SIID and the second SIID based on VPWS configuration information associated with the first AC and the second AC, respectively. The VPWS configuration information may include information associated with a VPWS service for transferring traffic between a pair of CEs 205 (e.g., a VPWS service associated with CE 205-1 and CE 205-3, a VPWS between CE 205-2 and CE 205-4). For example, the VPWS configuration information may include a pair of SIIDs (e.g., a local SIID and a remote SIID) that identify endpoints of the VPWS service (e.g., an AC that connects CE 205-1 to PE 210-1 and an AC that connects CE 205-3 to PE 210-2).

In some implementations, PE 210-1 may determine the first SIID and the second SIID based on first VPWS configuration information and second VPWS configuration information, respectively. For example, the first VPWS configuration information may include information that identifies a first local AC (e.g., that connects CE 205-1 to PE 210-1) associated with a first VPWS (e.g., a VPWS associated with transferring traffic between CE 205-1 and CE 205-3). Here, PE 210-1 may determine the first SIID as an SIID, included in the first VPWS configuration information, that corresponds to the first local AC. Similarly, the second VPWS configuration information may include information that identifies a second local AC (e.g., that connects CE 205-2 to PE 210-1) associated with a second VPWS (e.g., a VPWS associated with transferring traffic between CE 205-2 and CE 205-4). Here, PE 210-1 may determine the second SIID as an SIID, included in the second VPWS configuration information, that corresponds to the second local AC.

In some implementations, PE 210-1 may determine the first SIID and/or the second SIID based on user input. For example, PE 210-1 may determine the first SIID and/or the second SIID when the user provides input associated with the first VPWS configuration information and the second VPWS configuration information. Additionally, or alternatively, PE 210-1 may (e.g., automatically) determine the first SIID and/or the second SIID. For example, PE 210-1 may determine the first SIID and/or the second SIID when another device (e.g., PE 210-2, CE 205-1, CE 205-2) provides the first VPWS configuration information and/or the second VPWS configuration information. In some implementations, the first SIID and/or the second SIID may include a string of alphanumeric characters, a numerical value, a string of text, or the like.

In some implementations, PE 210-1 may verify that the first SIID differs from the second SIID. For example, PE 210-1 may compare the first SIID and the second SIID in order to determine whether the first SIID matches the second SIID. In a case where the first SIID matches the second SIID, PE 210-1 may assign a different SIID, in place of the first SIID and/or the second SIID, such that the first SIID no longer matches the second SIID. In some implementations, PE 210-1 may randomly generate the different SIID, may alter the first SIID or the second SIID to create the different SIID (e.g., by adding a character to a string of characters), or the like. Notably, in some implementations, an SIID need not differ for a particular VPWS service. For example, the first SIID, associated with the first VPWS service, may be identical to a third SIID, associated with the first VPWS, that is advertised by PE 210-2. In other words, SIIDs need only differ between VPWS services at a given PE 210.

As further shown in FIG. 4, process 400 may include advertising a first route based on the first identifier and a label associated with a network instance (block 420). For example, PE 210-1 may advertise a first Ethernet A-D per EVI route based on the first SIID and a label associated with the EVPN instance (e.g., a EVPN that spans at least two PEs 210). In some implementations, PE 210-1 may advertise the first Ethernet A-D per EVI route after PE 210-1 determines the first SIID.

The Ethernet A-D per EVI route includes a route associated with transferring traffic, associated with the VPWS service, via the EVPN instance that spans PE 210-1 and PE 210-2. In some implementations, PE 210-1 may advertise the first Ethernet A-D per EVI route in order to allow PE 210-2 (i.e., a remote PE), associated with the EVPN instance, to identify a route associated with the first VPWS service (e.g., associated with transferring traffic between CE 205-1 and CE 205-3).

In some implementations, PE 210-1 may advertise the route using a particular network layer reachability format. For example, PE 210-1 may advertise the first Ethernet A-D per EVI route in a format that includes a route distinguisher associated with PE 210-1 (e.g., a network address associated with PE 210-1), an ESI associated with the first AC (e.g., a value of zero when CE 205 is single-homed or a non-zero value when CE 205 is multi-homed), the first SIID associated with the first VPWS (e.g., included in an Ethernet tag field), and a label (e.g., an MPLS label) associated with the EVPN instance.

Here, assume that PE 210-2 has access to the first VPWS configuration information associated with the first VPWS (i.e., assume that, similar to PE 210-1 as described above, PE 210-2 has determines SIIDs corresponding to ACs associated with PE 210-2). Thus, when the first Ethernet A-D per EVI route advertisement reaches PE 210-2, PE 210-2 may determine, based on the first SIID included in the first Ethernet A-D per EVI route advertisement, that the Ethernet A-D per EVI route corresponds to the first VPWS service (e.g., since PE 210-2 has access to the first VPWS configuration information that indicates that the first SIID is associated with the first VPWS service). In some implementations, PE 210-1 may continue advertising the first Ethernet A-D per EVI route while the first AC, associated with the first VPWS service, is available.

As further shown in FIG. 4, process 400 may include advertising a second route based on the second identifier and the label associated with the network instance (block 430). For example, PE 210-1 may advertise a second Ethernet A-D per EVI route based on the second SIID and the label associated with the EVPN instance. In some implementations, PE 210-1 may advertise the second Ethernet A-D per EVI route after PE 210-1 determines the second SIID. In some implementations, PE 210-1 may begin advertising the second Ethernet A-D per EVI route at a different (e.g., earlier or later) time than PE 210-1 begins advertising the first Ethernet A-D per EVI route.

In some implementations, PE 210-1 may advertise the second Ethernet A-D per EVI route in order to allow PE 210-2, associated with the EVPN instance, to identify a route associated with the second VPWS service (e.g., associated with transferring traffic between CE 205-2 and CE 205-4).

In some implementations, PE 210-1 may advertise the route using the particular network layer reachability format, as described above. For example, PE 210-1 may advertise the second Ethernet A-D per EVI route in the format that includes the route distinguisher associated with PE 210-1, an ESI associated with the second AC, the second SIID associated with the second VPWS, and the MPLS label associated with the EVPN instance. Here, assume that PE 210-2 has access to the second VPWS configuration information associated with the second VPWS. Thus, when the second Ethernet A-D per EVI route advertisement reaches PE 210-2, PE 210-2 may determine, based on the second SIID included in the route advertisement, that the Ethernet A-D per EVI route corresponds to the second VPWS service (e.g., since PE 210-2 has access to the second VPWS configuration information that indicates that the second SIID is associated with the second VPWS service). In some implementations, PE 210-1 may continue advertising the second Ethernet A-D per EVI route while the second AC, associated with the second VPWS service, is available.

Notably, both the first Ethernet A-D per EVI route and the second Ethernet A-D per EVI route include the same MPLS label associated with the EVPN instance. In other words, PE 210-1 may include a same label, associated with the EVPN instance, in multiple Ethernet A-D per EVI routes advertised by PE 210-1. This reduces label usage (e.g., to one label) by PE 210-1 in accordance the flexible cross-connect service, and allows for increased scalability, as described above.

In some implementations, PE 210-2 may advertise multiple Ethernet A-D per EVI routes in a manner similar to that of PE 210-1 (e.g., PE 210-2 may advertise Ethernet A-D per EVI routes, associated with the first VPWS and the second VPWS, using a third SIID corresponding to a third AC associated with the first service, a fourth SIID corresponding to a fourth AC associated with the second service, and a single MPLS label).

As further shown in FIG. 4, process 400 may include determining that the first connection is unavailable (block 440). For example, PE 210-1 may determine that the first AC is unavailable. In some implementations, PE 210-1 may determine that the first AC is unavailable after PE 210-1 advertises the first Ethernet A-D per EVI route.

In some implementations, PE 210-1 may determine that the first AC is unavailable based on information associated with the first AC, such as based on detecting that a link, associated with the first AC, has failed. Additionally, or alternatively, PE 210-1 may determine that the first AC is unavailable based on information associated with CE 205-1, such as when PE 210-1 receives an indication that CE 205 has experienced an error. Additionally, or alternatively, PE 210-1 may determine that the first AC is unavailable based on information associated with PE 210-1, such as when PE 210-1 experiences an error associated with sending and/or receiving information via the first AC and/or using the first service.

As further shown in FIG. 4, process 400 may include withdrawing the first route based on determining that the first connection is unavailable (block 450). For example, PE 210-1 may withdraw the first Ethernet A-D per EVI route based on determining that the first AC is unavailable.

In some implementations, PE 210-1 may withdraw the first Ethernet A-D per EVI route in order to indicate that the first AC is no longer available and/or to indicate that the first VPWS is no longer available (i.e., that traffic, associated with the first VPWS service, can no longer be provided to CE 205-1). For example, PE 210-1 may withdraw the first Ethernet A-D per EVI route (i.e., stop advertising the first Ethernet A-D per EVI route), and PE 210-2 may detect that the first Ethernet A-D per EVI route has been withdrawn (i.e., detect that PE 210-1 has stopped advertising the first Ethernet A-D per EVI route). Here, based on detecting the first Ethernet A-D per EVI route has been withdrawn, PE 210-2 may withdraw a corresponding Ethernet A-D per EVI route, associated with the first VPWS, from advertisement by PE 210-2. In this example, due to the Ethernet A-D per EVI routes, associated with the first VPWS service, being withdrawn, PE 210-1 and PE 210-2 may stop forwarding traffic associated with the first VPWS service. This may reduce an amount of wasted network resources (e.g., since PE 210-1 and PE 210-2 will no longer forward traffic associated with the first VPWS service).

In this way, PE 210-1 may signal to PE 210-2 (and/or one or more other PEs 210 when an endpoint of the first VPWS is multi-homed) that the first VPWS service is unavailable. Notably, PE 210-1 may withdraw the first Ethernet A-D per EVI route while maintaining advertisement of (i.e., continuing to advertise) the second Ethernet A-D per EVI route, where both the first Ethernet A-D per EVI route and the second Ethernet A-D per EVI route include the same MPLS label associated with the EVPN instance. Thus, MPLS label usage is conserved while allowing for signaling of unavailability of a particular AC and/or a particular VPWS service.

In some implementations, advertising Ethernet A-D per EVI routes in this manner allows for load balancing for VPWS services using the flexible cross-connect service when CE 205 is multi-homed to multiple PEs 210. For example, for multi-homed CE 205 with one ESI per port, since each AC (e.g., connecting CE 205 to multiple PEs 210) is associated with a different SIID, each PE 210 may originate a separate Ethernet A-D per EVI route for a corresponding multi-homed AC associated with multi-homed CE 205. As such, different VPWS services on a same ES (e.g., associated with multiple multi-homed ACs) may operate independently. Moreover, load balancing, associated with the VPWS services, may be performed since traffic, associated with the different VPWS services, may be identified based on the different SIIDs. An example associated with this concept is described below with regard to FIG. 6.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
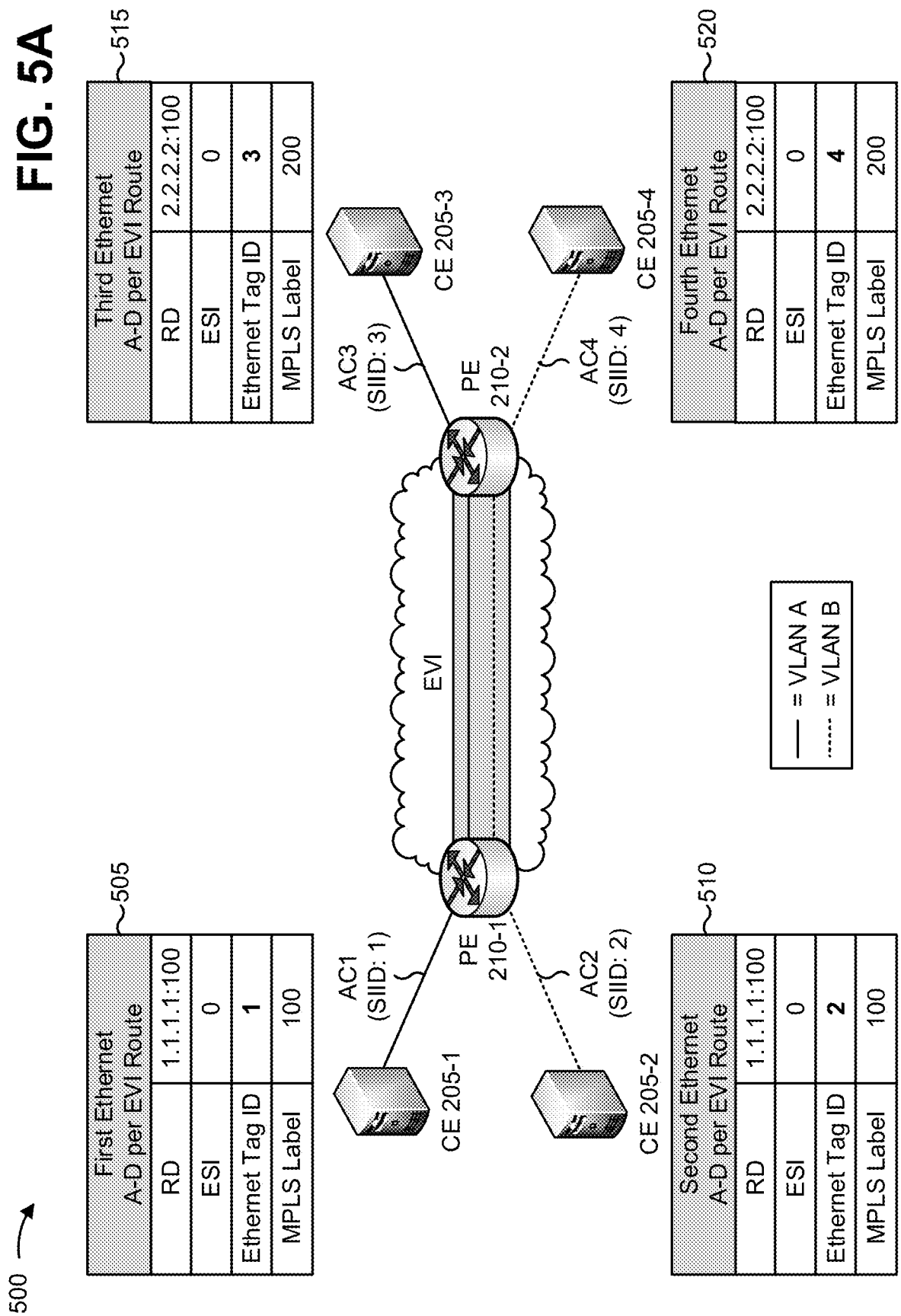

FIGS. 5A and 5B are diagrams of an example implementation 500 relating to example process 400 shown in FIG. 4. As shown in FIG. 5A, an EVPN instance (EVI) is configured between PE 210-1 and PE 210-2. Here, assume that a first VPWS service, within the EVPN instance, is associated with transferring VLAN A traffic between CE 205-1 and CE 205-3, and that a second VPWS service, within the EVPN instance, is associated with transferring VLAN B traffic between CE 205-2 and CE 205-4. Further, assume that each PE 210 has access to VPWS configuration information, associated with the first VPWS service and the second VPWS service, that includes SIIDs corresponding to ACs associated with the first VPWS service and the second VPWS service (i.e., each PE 210 has access to SIIDs that identify ACs connected to the other PE 210).

As shown in FIG. 5A, and by reference number 505, PE 210-1 may advertise a first Ethernet A-D per EVI route associated with the first VPWS service. As shown, the first Ethernet A-D per EVI route advertisement may include a route distinguisher (RD) associated with PE 210-1 (e.g., 1.1.1.1:100), an ESI (e.g., set to zero since CE 205-1 is single-homed) for a first AC (e.g., AC1) associated with the first VPWS service, a first SIID (e.g., 1) that corresponds to the first AC, and an MPLS label, associated with the EVPN instance, stored and/or assigned by PE 210-1 (e.g., 100).

As further shown in FIG. 5A, and by reference number 510, PE 210-1 may also advertise a second Ethernet A-D per EVI route associated with the second VPWS service. As shown, the second Ethernet A-D per EVI route advertisement may include the route distinguisher associated with PE 210-1, an ESI (e.g., set to zero since CE 205-2 is single-homed) for a second AC (e.g., AC2) associated with the second VPWS service, a second SIID (e.g., 2) that corresponds to the second AC, and the MPLS label associated with the EVPN instance. Notably, both the first Ethernet A-D per EVI route and the second Ethernet A-D per EVI route include the same MPLS label (e.g., 100).

As further shown in FIG. 5A, and by reference number 515, PE 210-2 may advertise a third Ethernet A-D per EVI route associated with the first VPWS service. As shown, the third Ethernet A-D per EVI route advertisement may include a route distinguisher associated with PE 210-2 (e.g., 2.2.2.2:100), an ESI for a third AC (e.g., AC3) associated with the first VPWS service, a third SIID (e.g., 3) that corresponds to the third AC, and an MPLS label, associated with the EVPN instance, stored and/or assigned by PE 210-2 (e.g., 200).

As further shown in FIG. 5A, and by reference number 520, PE 210-2 may also advertise a fourth Ethernet A-D per EVI route associated with the second VPWS service. As shown, the fourth Ethernet A-D per EVI route advertisement may include the route distinguisher associated with PE 210-2, an ESI for a fourth AC (e.g., AC4) associated with the second VPWS service, a fourth SIID (e.g., 4) that corresponds to the fourth AC, and the MPLS label, associated with the EVPN instance, stored by PE 210-2. Notably, both the third Ethernet A-D per EVI route and the fourth Ethernet A-D per EVI route include the same MPLS label (e.g., 200). Here, PE 210-1 and PE 210-2 may exchange Ethernet A-D per EVI routes, and may provide traffic, associated with the first VPWS service and the second VPWS service, via the EVPN instance.

As shown in FIG. 5B, and by reference number 525, PE 210-1 may determine (e.g., at a later time) that the first AC, associated with the first VPWS service, is unavailable (e.g., when the link associated with the AC1 fails). As shown by reference number 530, based on determining that the first AC is unavailable, PE 210-1 may withdraw the first Ethernet A-D per EVI route (i.e., stop advertising the first Ethernet A-D per EVI route). In this way, PE 210-1 may signal to PE 210-2 that the first AC is unavailable (e.g., that the first VPWS service is down). As shown by reference number 535, PE 210-2 may detect the withdrawal of the first Ethernet A-D per EVI route (i.e., by determining that PE 210-1 has stopped advertising the first Ethernet A-D per EVI route) and may withdraw the third Ethernet A-D per EVI route that corresponds to the first VPWS service. Here, PE 210-1 may effectively notify PE 210-2 regarding the unavailability of the first AC while both maintaining advertisement of the second Ethernet A-D per EVI route and using a single MPLS label for the EVPN instance. In this way, network resources may be conserved, as both PE 210-1 and PE 210-2 may stop forwarding traffic associated with the first VPWS service (while maintaining the second VPWS service and using only a single MPLS label).

As indicated above, FIGS. 5A and 5B are provided merely as an example. Other examples are possible and may differ from what was described with regard to FIGS. 5A and 5B.

FIG. 6 is a diagram of an additional example implementation 600 relating to example process 400 shown in FIG. 4. As shown in FIG. 6, an EVPN instance (EVI) is configured between PE 210-1, PE 210-2, and PE 210-3. Here, assume that a first VPWS service, within the EVPN instance, is associated with transferring VLAN A traffic between CE 205-1 and CE 205-2, that a second VPWS service, within the EVPN instance, is associated with transferring VLAN B traffic between CE 205-1 and CE 205-2, and that a third VPWS service, within the EVPN instance, is associated with transferring VLAN C traffic between CE 205-1 and CE 205-2. Further, assume that each PE 210 has access to VPWS configuration information, associated with the first VPWS service, the second VPWS service, and the third VPWS service, that includes SIIDs corresponding to multi-homed ACs associated with the first VPWS service, the second VPWS service, and the third VPWS service (i.e., each PE 210 has access to SIIDs that identify ACs connected to the other PE 210). For purpose of simplicity, only Ethernet A-D per EVI routes advertised by PE 210-1 are shown in FIG. 6.

As shown in FIG. 6, and by reference number 605, PE 210-1 may advertise a first Ethernet A-D per EVI route associated with the first VPWS service. As shown, the first Ethernet A-D per EVI route advertisement may include a route distinguisher (RD) associated with PE 210-1 (e.g., 2.2.2.2:100), an ESI associated with the multi-homed ACs of PE 210-1 (e.g., 10:00::10), a first SIID (e.g., 1) that corresponds to a first multi-homed AC, of the multi-homed ACs, that is associated with the first VPWS service, and an MPLS label, associated with the EVPN instance, stored and/or assigned by PE 210-1 (e.g., 200).

As further shown in FIG. 6, and by reference number 610, PE 210-1 may advertise a second Ethernet A-D per EVI route associated with the second VPWS service. As shown, the second Ethernet A-D per EVI route advertisement may include the route distinguisher associated with PE 210-1, the ESI associated with the multi-homed ACs of PE 210-1, a second SIID (e.g., 2) that corresponds to a second multi-homed AC, of the multi-homed ACs, that is associated with the second VPWS service, and the MPLS label associated with the EVPN instance (e.g., 200).

As further shown in FIG. 6, and by reference number 615, PE 210-1 may advertise a third Ethernet A-D per EVI route associated with the third VPWS service. As shown, the third Ethernet A-D per EVI route advertisement may include the route distinguisher associated with PE 210-1, the ESI associated with the multi-homed ACs of PE 210-1, a third SIID (e.g., 3) that corresponds to a third multi-homed AC, of the multi-homed ACs, that is associated with the third VPWS service, and the MPLS label associated with the EVPN instance (e.g., 200).

Notably, the first Ethernet A-D per EVI route, the second Ethernet A-D per EVI route, and the third Ethernet A-D per EVI route include the same MPLS label (e.g., 200). Here, PE 210-2 and PE 210-3 may also advertise multiple Ethernet A-D per EVI routes such that PE 210-1, PE 210-2, and PE 210-3 exchange Ethernet A-D per EVI routes associated with the first VPWS service, the second VPWS service, and the third VPWS service. Each PE 210 may then provide traffic, associated with the first VPWS service, the second VPWS service, and the third VPWS service via the EVPN instance.

In this example, PE 210-1, PE 210-2, and/or PE 210-3 may detect AC unavailability and withdraw a corresponding Ethernet A-D per EVI route, in a manner similar to that described above. In other words, each PE 210 may signal to other PEs 210 regarding unavailability of an AC while both maintaining advertisement of other Ethernet A-D per EVI routes and using a single MPLS label for the EVPN instance.

Moreover, load balancing may be achieved for traffic associated with the first VPWS service, the second VPWS service, and the third VPWS service as a result of using the first SIID, the second SIID, and the third SIID to identify the multi-homed ACs (e.g., rather than a single SIID for all ACs). For example, as shown by the table associated with reference number 620, different designated forwarders (DFs) may be selected for different SIIDs (e.g., PE 210-1 is the designated forwarder for traffic associated with the first SIID and the third SIID, while PE 210-2 is the designated forwarder for traffic associated with the second SIID). Thus, load balancing may be achieved on a per VPWS service basis while using a single MPLS label per EVPN instance.

As indicated above, FIG. 6 is provided merely as an example. Other examples are possible and may differ from what was described with regard to FIG. 6.

Implementations described herein may provide a PE configured to advertise multiple Ethernet A-D per EVI routes, associated with multiple ACs, where each Ethernet A-D per EVI route includes a SIID corresponding to a single AC, of the multiple ACs, and a same MPLS label in accordance with a flexible cross-connect service. Advertisement of multiple Ethernet A-D per EVI routes allow the PE to signal when a particular AC, of the multiple ACs, is unavailable, while reducing label usage through use of the same MPLS label in each of the Ethernet A-D per EVI routes. Here, advertisement of the multiple Ethernet A-D per EVI routes allows network resources to be conserved by allowing for signaling of unavailable ACs, thereby preventing traffic, associated with the unavailable AC, from being sent (i.e., such that network resources are not wasted or used inefficiently).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A provider edge (PE) device, comprising:
a memory; and
one or more processors to:
   determine a first identifier and a second identifier,
      wherein the first identifier is a first service instance identifier,
      the first identifier corresponding to a first connection for a first service,
         wherein the first service is a first virtual private wire service, and
         wherein the first connection is between a first customer edge (CE) device and the PE device,
      the second identifier corresponding to a second connection for a second service,
         wherein the second service is a second virtual private wire service,
         wherein the second identifier is a second service instance identifier, and
         wherein the second connection is between a second CE device and the PE device;
   advertise a first route, corresponding to the first virtual private wire service and including the second connection, based on the first identifier and a label corresponding to a network instance associated with the first service and the second service;
   advertise a second route, associated with the second service, based on the second identifier and the label corresponding to the network instance;
   determine that the first connection is unavailable; and
   withdraw advertisement of the first route based on determining that the first connection is unavailable,
      wherein advertisement of the first route is withdrawn by the PE device while the PE device continues to advertise the second route,
         wherein advertisement of the second route is maintained before and after withdrawing advertisement of the first route,
      wherein the first route and the second route are based on the label corresponding to the network instance, and
      wherein advertisement of the first route is withdrawn to indicate, to a remote PE device associated with the first service, that the first connection is unavailable.

2. The PE device of claim 1, where the network instance is an Ethernet virtual private network (EVPN) instance and the label is a multi-protocol label switching label associated with the EVPN instance.

3. The PE device of claim 1, where the first route is a first Ethernet auto-discovery (A-D) per EVPN instance route and the second route is a second Ethernet A-D per EVPN instance route.

4. The PE device of claim 1, where the first route is withdrawn to cause the remote PE device, associated with the first service, to withdraw advertisement of a third route associated with the first service.

5. The PE device of claim 1, where the one or more processors are further to:
   receive first configuration information, associated with the first service, and second configuration information associated with the second service,
      the first configuration information including the first identifier and the second configuration information including the second identifier; and
   where the one or more processors, when determining the first identifier and the second identifier, are to:
      determine the first identifier based on the first configuration information and determine the second identifier based on the second configuration information.

6. The PE device of claim 5, where the one or more processors are further to:
   receive the first configuration information or the second configuration information based on user input.

7. The PE device of claim 1, where the one or more processors are further to:
   determine that the first CE device has experienced an error; and
   where the one or more processors, when determining that the first connection is unavailable, are to:
      determine that the first connection is unavailable based on determining that the first CE device has experienced the error.

8. A system, comprising:
a first provider edge (PE) device to:
   determine a first identifier corresponding to a first access circuit associated with a first service,
      wherein the first service is a first virtual private wire service,
      wherein the first identifier is a first service instance identifier, and
      wherein the first access circuit is associated with a link between a first customer edge (CE) device and the first PE device;
   determine a second identifier corresponding to a second access circuit associated with a second service,
      wherein the second service is a second virtual private wire service,
      wherein the second identifier is a second service instance identifier, and
      wherein the second access circuit is associated with a link between a second CE device and the first PE device;
   advertise a first route, associated with the first service, based on the first identifier and a network instance label,
      the network instance label identifying a network instance associated with the first service and the second service;
   advertise a second route, associated with the second service, based on the second identifier and the network instance label;
   determine that the first access circuit is unavailable; and
   withdraw advertisement of the first route based on determining that the first access circuit is unavailable,
      wherein advertisement of the first route is withdrawn by the first PE device while the first PE device continues to advertise the second route,
         wherein advertisement of the second route is maintained before and after withdrawing advertisement of the first route, and wherein the first route and the second route is based on the network instance label; and a second PE device to:
   detect withdrawal of the first route by the first PE device; and
   withdraw a third route, corresponding to the first virtual private wire service, based on detecting the withdrawal of the first route.

9. The system of claim 8, where the network instance is an Ethernet virtual private network (EVPN) instance and the network instance label is a multi-protocol label switching label associated with the EVPN instance.

10. The system of claim 8, where the first route is a first Ethernet auto-discovery (A-D) per EVPN instance route, the second route is a second Ethernet A-D per EVPN instance route, and the third route is a third Ethernet A-D per EVPN instance route.

11. The system of claim 8, where the second PE device is further to:
   maintain advertisement of a fourth route associated with the second service after withdrawing the third route.

12. The system of claim 8, where the first PE device is further to:
   receive first configuration information, associated with the first service, and second configuration information associated with the second service,
      the first configuration information including the first identifier and the second configuration information including the second identifier; and
   where the first PE device, when determining the first identifier and the second identifier, is to:
      determine the first identifier based on the first configuration information and determine the second identifier based on the second configuration information.

13. The system of claim 8, where the first PE device is further to:
   determine that the first access circuit has failed; and
   where the first PE device, when determining that first access circuit is unavailable, is to:
      determine that the first access circuit is unavailable based on determining that the first access circuit has failed.

14. The system of claim 8, where the first PE device is further to:
   detect that the link associated with the first access circuit has failed; and
   where the first PE device, when determining that first access circuit is unavailable, is to:
      determine that first access circuit is unavailable based on detecting that the link associated with the first access circuit has failed.

15. A method, comprising:
   advertising, by a provider edge (PE) device, a first route, associated with a first service, based on a first identifier and a label corresponding to a network instance associated with the PE device,
      wherein the first service is a first virtual private wire service,
      wherein the first identifier is a first service instance identifier, and
      the first identifier corresponding to a first connection between a first customer edge (CE) device and the PE device;
   advertising, by the PE device, a second route, associated with a second service, based on a second identifier and the label corresponding to the network instance,
      wherein the second service is a second virtual private wire service,
      wherein the second identifier is a second service instance identifier, and
      the second identifier corresponding to a second connection between a second CE device and the PE device;
   determining, by the PE device, that the first connection is unavailable; and
   withdrawing, by the PE device and based on determining that the first connection is unavailable, advertisement of the first route,
      wherein advertisement of the first route is withdrawn by the PE device while the PE device continues to advertise the second route,
         wherein advertisement of the second route is maintained before and after withdrawing advertisement of the first route,
      wherein the first route and the second route is based on the label corresponding to the network instance, and
      wherein the first route is withdrawn to indicate, to a remote PE device corresponding to the first virtual private wire service, that the first service is unavailable.

16. The method of claim 15, where the network instance is an Ethernet virtual private network (EVPN) instance and the label is a multi-protocol label switching label associated with the EVPN instance.

17. The method of claim 15, where the first route is a first Ethernet auto-discovery (A-D) per EVPN instance route and the second route is a second Ethernet A-D per EVPN instance route.

18. The method of claim 15, where the first route is withdrawn to cause the remote PE device to withdraw advertisement of a third route associated with the first service.

19. The method of claim 15, further comprising:
   determining that the PE device has experienced an error associated with the first connection; and
   where determining that the first connection is unavailable comprises:
      determining that the first connection is unavailable based on determining that the PE device has experienced the error associated with the first connection.

20. The method of claim 15, further comprising:
   detecting that a link associated with the first connection has failed; and
   where determining that the first connection is unavailable comprises:
      determining that the first connection is unavailable based on detecting that the link associated with the first connection has failed.

* * * * *